(12) United States Patent
Lee et al.

(10) Patent No.: US 11,789,297 B2
(45) Date of Patent: Oct. 17, 2023

(54) ADJUSTABLE OPTICAL PHASE SHIFTER ARRAY

(71) Applicant: National Taiwan University of Science and Technology, Taipei (TW)

(72) Inventors: San-Liang Lee, Taipei (TW); Tsung-Han Lee, New Taipei (TW); Chia-Hsuan Yang, Tainan (TW)

(73) Assignee: NATIONAL TAIWAN UNIVERSITY OF SCIENCE AND TECHNOLOGY, Taipei (TW)

( * ) Notice: Subject to any disclaimer, the term of this patent is extended or adjusted under 35 U.S.C. 154(b) by 0 days.

(21) Appl. No.: 17/586,819

(22) Filed: Jan. 28, 2022

(65) Prior Publication Data
US 2022/0252914 A1 Aug. 11, 2022

(30) Foreign Application Priority Data

Feb. 9, 2021 (TW) .................................. 110104908

(51) Int. Cl.
*G02F 1/03* (2006.01)
*G02F 1/01* (2006.01)

(52) U.S. Cl.
CPC ............ *G02F 1/0316* (2013.01); *G02F 1/011* (2013.01); *G02F 1/0311* (2013.01)

(58) Field of Classification Search
CPC ....... G02F 1/0316; G02F 1/011; G02F 1/0311
See application file for complete search history.

(56) References Cited

U.S. PATENT DOCUMENTS 7,911,383 B2 * 3/2011 Haskell ............... H01Q 21/061
342/372
8,058,669 B2 * 11/2011 Chen ..................... H05K 1/113
257/E33.057

(Continued)

OTHER PUBLICATIONS

Doylend et al., Two-dimensional free-space beam steering with an optical phased array on silicon-on-insulator, Opt. Express 19, 21595-21604 (2011) (Year: 2011).*

(Continued)

*Primary Examiner* — Peter Radkowski
(74) *Attorney, Agent, or Firm* — WPAT, P.C

(57) ABSTRACT

An optical phase shifter array includes: $1^{st}$~$n^{th}$ optical-splitting elements, wherein each has an input end, a first output end and a second output end, and the input end of the $1^{st}$ optical-splitting element receives an input light and outputs an evenly distributed optical signal to the optical-splitting element of the next stage, and n is a positive integer above 1; a plurality of first optical waveguides respectively connected to the input end of the optical-splitting element odd-numbered of the next stage and the first output end of the optical-splitting element of the previous stage; a plurality of second optical waveguides respectively connected to the input end of the optical-splitting-element even-numbered of the previous stage; and phase shifters of the $1^{st}$ to the $k^{th}$ stage, which makes the optical signal passing through the optical waveguides produce a phase shift by heating or electro-optic effects.

14 Claims, 11 Drawing Sheets

(56) References Cited

U.S. PATENT DOCUMENTS

| | | | |
|---|---|---|---|
| 10,211,529 B2* | 2/2019 | Haskell | H01Q 21/22 |
| 10,261,390 B2* | 4/2019 | Kim | G02F 1/2955 |
| 10,678,117 B2* | 6/2020 | Shin | G01S 7/4813 |
| 10,754,222 B2* | 8/2020 | Shin | H01S 5/142 |
| 10,976,542 B2* | 4/2021 | Russo | G02B 27/0068 |
| 10,983,413 B2* | 4/2021 | Shin | G02F 1/2955 |
| 11,092,691 B2* | 8/2021 | Shim | G01S 17/42 |
| 11,112,493 B2* | 9/2021 | Yoon | G02F 1/2955 |
| 11,320,717 B2* | 5/2022 | Zhu | G01S 17/89 |
| 11,428,961 B2* | 8/2022 | Lee | G02F 1/01708 |
| 2009/0167605 A1* | 7/2009 | Haskell | H01Q 21/061 |
| | | | 342/368 |
| 2010/0051972 A1* | 3/2010 | Chen | H05K 1/113 |
| | | | 257/E33.066 |
| 2016/0352010 A1* | 12/2016 | Haskell | H01Q 3/30 |
| 2018/0052378 A1* | 2/2018 | Shin | G02F 1/292 |
| 2018/0059507 A1* | 3/2018 | Kim | G02F 1/2955 |
| 2019/0004394 A1* | 1/2019 | Shin | G02F 1/3137 |
| 2019/0025408 A1* | 1/2019 | Hwang | G01S 7/4808 |
| 2019/0219675 A1* | 7/2019 | Yoon | G01S 7/4817 |
| 2019/0235233 A1* | 8/2019 | Russo | G02B 27/0087 |
| 2019/0243000 A1* | 8/2019 | Shim | G01S 17/931 |
| 2019/0391459 A1* | 12/2019 | Shin | H01S 3/10053 |
| 2020/0103679 A1* | 4/2020 | Lee | H01S 5/50 |
| 2020/0264490 A1* | 8/2020 | Zhu | G01S 17/89 |
| 2020/0355983 A1* | 11/2020 | Lipson | G02B 6/12033 |
| 2021/0223544 A1* | 7/2021 | Russo | G02F 1/2955 |
| 2021/0373131 A1* | 12/2021 | Hwang | G02F 1/0126 |

OTHER PUBLICATIONS

Phare et al., Silicon Optical Phased Array with High-Efficiency Beam Formation over 180 Degree Field of View, 2018, available at https://arxiv.org/abs/1802.04624v1 (Year: 2018).*

Serati et al., Beam combining using a phased array of phased arrays (PAPA), 2004 IEEE Aerospace Conference Proceedings (IEEE Cat. No. 04TH8720), Big Sky, MT, USA, 2004, pp. 1729 vol. 3, doi: 10.1109/AERO.2004.1367949. (Year: 2004).*

* cited by examiner

ADJUSTABLE OPTICAL PHASE SHIFTER ARRAY

CROSS REFERENCE TO RELATED APPLICATION

All related applications are incorporated by reference. The present application is based on, and claims priority from, Taiwan Application Serial Number 110104908, filed on Feb. 9, 2021, the disclosure of which is hereby incorporated by reference herein in its entirety.

TECHNICAL FIELD

The technical field relates to an optical phase shifter array, in particular to an adjustable optical phase shifter array having a multi-stage structure.

BACKGROUND

Currently available technologies usually use mechanical beam steering as the solution to realize beam steering of LiDARs. However, a hardware system for mechanical beam steering is of large size and consumes a large amount of energy. Besides, a mechanical beam steering system is also restricted by the mechanical structures thereof, so the steering ability of the system is also limited. The mechanical-optical beam steering system tends to be influenced by physical wear and vibration. Further, as the mechanical-optical beam steering system originally lacks the ability of controlling beam forming, the system needs additional devices, such as lens, prism, etc., so as to realize the function of controlling beam forming, which significantly increases the structural complexity and the stability of the system. Beam forming and beam steering are also needed for the antenna array used in mobile networks and vehicle networks. Beam steering of phase arrayed antennas is usually conducted with microwave delayed lines, but it may be very bulky if tens or hundreds of antennas are used in an array.

An optical phase shifter array composed of an array of optical antennas can cause the interference of the radiant waves from several paths to generate a beam pattern by adjusting and controlling the phase difference. The optical phase shifter arrays, realize by photonics integration, can provide the beam forming and steering functions for LiDARs without the need of a mechanical beam steering structure, so the phased arrays can be much stable and compact. An optical phase shifter arrays composed of an array of optical antennas can cause the interference of the radiated waves from the antennas to generate a random beam pattern so as to adjust the angle of the beam and execute beam steering by properly adjusting and controlling the phase difference of the light reaching the optical antennas. The optical phase shifter array can also provide the needed phase shift for the microwave phase arrayed antenna with the electric-optoelectronic conversion and optoelectronic-electric conversion.

However, the phase errors in the light reaching the optical antennas or microwave antennas would obviously degrade the beam quality. These phase errors may be caused by the uniformity of manufacturing processes or environmental changes. As a result, it is a complicated and time-consuming process to calibrate all phase errors. Specially, the number of the optical antennas or microwave antennas supported by an optical phase shifter array may be up to hundreds in order to reduce the divergence angle of the output beam. Therefore, it is a very important and complicated task to calibrate all phase errors of all antennas. Accordingly, it is necessary to design precision phase shifters and effective phase control method so as to highly concentrate the beam.

There are two types of precision phase shifters most frequently-used, which are electro-optic phase shifter and thermal phase shifter. An electro-optic phase shifter can change the concentration of the free carriers of an optical waveguide by applying an electric field, such that the effective refraction index of the optical waveguide can be changed in order to achieve the objective of altering the phase of the optical wave. However, since electro-optic effect is relatively weak in silicon, it is necessary to adopt a longer optical waveguide, which increases the loss of optical propagation and occupies a larger area of the chip. Regarding thermal phase shifter, a thermal phase shifter can change the effective refraction index of an optical waveguide via the temperature of thermos-optic effect by heating the optical waveguide or electro-optic effects. In general, heating wires are manufactured on the cladding layer above the optical waveguide. The heating wires may be metal or semiconductor produced by a semiconductor manufacturing process, and there should be a distance between the heating wires and the optical waveguide in order to achieve the desired heating effect but prevent from optical loss. The advantages thereof include high efficiency and low consumption, but the problem thereof is how to accurately control temperature and thermal crosstalk. There is also a concern of the response time of the thermal heating effect.

The phase shifters are usually arranged in a single stage between the stage of optical splitting of input light and the stage of optical antennas. A phase control method is adopted to adjust the phase of each phase shifter to correct the phase errors from manufacturing and to steer the output beam. An array of digital-to analog (DAC) converters of driving circuits are used to provide the required phase shift to each phase shifter.

SUMMARY

One of the primary objectives of the disclosure is to provide an adjustable phase shifter array, which having optical-splitting elements of a plurality of stages and phase shifters of a plurality of stages connected thereto in series so as to evenly distribute an input light to a plurality of phase-adjustable optical waveguides. The adjustable optical phase shifter array includes $1^{st}$~$n^{th}$ optical-splitting elements, a plurality of first optical waveguides, a plurality of second optical waveguides and phase shifters of $1^{st}$~$k^{th}$ stages. Each of the $1^{st}$~$n^{th}$ optical-splitting elements has an input end, a first output end and a second output end. The input end of the $1^{st}$ optical-splitting element receives the input light and evenly distributes the optical signal of the input light to the optical-splitting element of the next stage; n is an integer equal to or above 1. The first optical waveguides are respectively connected to the input ends of the optical-splitting elements odd-numbered of the next stage and the first output ends of the optical-splitting elements of the previous stage so as to receive the optical signal. The second optical waveguides are respectively connected to the input ends of the optical-splitting elements even-numbered of the next stage and the second output ends of the optical-splitting elements of the previous stage so as to receive the optical signal. The phase shifters of the $1^{st}$~$k^{th}$ stages respectively cover the first optical waveguides or connect to the first optical wave guides to form a first phase shifter group, and the first phase shifter group makes the optical signal passing through the first optical wave guides generate phase shift by applying electric current or voltage to the phase shifters; k is a positive integer. The first phase shifter group includes a first electrode, a first metal conductive wire, phase shifters, a second electrode and a second metal conductive wire. The first metal conductive wire is connected to the first electrode. The first phase shifter covers the first optical waveguide by putting a heating wires near the first optical waveguide or burying the electro-optic phase shifter in the first optical wave guide, and one end of the first phase shifter is connected to the first metal conductive wire. The second metal conductive wire is respectively connected to the second electrode and the other end of the phase shifter. The optical-splitting elements of each stage are provided with the phase shifters of one stage disposed therebetween. The number of the optical-splitting elements in each stage is increased by power of 2 and the phase shifter length of the phase shifters of the next stage is less than the phase shifter length of the phase shifters of the previous stage. The numbers of the optical-splitting elements, the optical waveguides and the phase shifters can be increased according to the size of the optical phase shifter array. For example, if it is necessary to connect the optical-splitting elements of 10 stages with one another, the input light can be evenly distributed over 1024 output optical waveguides.

The first phase shifter group at each stage is to provide the binary values of phase shift for the first waveguides at the output of each optical splitting element of the same stage. The phase shift can be varied from stage to stage. A fine-tuning phase shifter can be added at every output waveguide of the last or intermediate stage to correct the phase. By tuning the phase of each stage, the resultant phases can be used to steer a microwave or optical beam. The beam steering of microwave signals can be achieved with the disclosed optical phase shifter array by adding an electric-optoelectronic converter before the optical phase shifter array and an optoelectronic-electric converter after.

In one embodiment of the disclosure, the phase shift provided by the first phase shifter group at the i-th stage, where i=1 to k, to the first waveguide is $2^{k-1}\varphi$, so the phase shift at the output waveguides of the k-th stage is 0, $\varphi$, $2\varphi$, ..., $(2^k-1)\varphi$. The linear variation of phase at the output waveguides makes the interference pattern of waves emitted by output emitters direct to a certain orientation, which can be steered by changing cp. The output emitters can be optical diffraction elements, waveguide facets, or microwave antenna with an optoelectronic-electronic conversion element that is connected to the optical waveguide output. The arrangement allows to steer the orientation of the interference pattern with k driving circuits.

In one embodiment of the disclosure, the phase shifter at the output of the preceding optical-splitting element odd-numbered and covering the first optical waveguides is electrically connected to the second electrode via the second metal conductive wire.

In one embodiment of the disclosure, the total lengths of the phase shifters of all sages are substantially equal to each other.

In one embodiment of the disclosure, the phase shifters of the $1^{st}$~$k^{th}$ stages further respectively cover the second optical waveguides to form a second phase shifter group, and the second phase shifter group makes the optical signal passing through the second optical waveguides generate a phase shift by applying electric current or voltage to the phase shifters. The second phase shifter group includes a third electrode, a third metal conductive wire, a second phase shifters, a fourth electrode and a fourth metal conductive wire. The third metal conductive wire is connected to the third electrode. The second phase shifters covering the second optical waveguides and one end of the second phase shifters is connected to the third metal conductive wire. The fourth metal conductive wire is respectively connected to the fourth electrode and the other end of the second phase shifters.

In one embodiment of the disclosure, the phase shift generated by the second phase shifter is different from or reverse to the phase shift generated by the first phase shifter group.

In one embodiment of the disclosure, the phase shift generated by the second phase shifter group can steer the output interference pattern to the opposite orientation from that of the first phase shifter group. Two phase shifter groups can be operated on the same time to steer two beams to different orientations.

In one embodiment of the disclosure, the first phase shifters and the second phase shifters are metal conductive wires having higher resistance or semiconductor wires to provide the phase shift by thermal effect.

In one embodiment of the disclosure, the first phase shifters and the second phase shifters are semiconductor optical waveguides with PN junctions to provide the phase shift by applying an electric field to change the refractive indices in the optical waveguides.

In one embodiment of the disclosure, the phase shifter of the output of the preceding optical-splitting element even-numbered and covering the second optical waveguides is electrically connected to the fourth electrode via the fourth metal conductive wire.

In one embodiment of the disclosure, the phase shifters inside the same stage can be divided into more than two phase shifter groups.

In one embodiment of the disclosure, the phase shifters inside the same stage and after the third stages can be divided into four phase shifter groups. The phase shifters covering the first output end of the optical-splitting element odd-numbered of the same stage are connected to each other and respectively connected to the first electrode and the second electrode. The phase shifters covering the second output end of the optical-splitting element odd-numbered of the same stage are connected to each other and respectively connected to the third electrode and the fourth electrode. The phase shifters covering the first output end of the optical-splitting element even-numbered of the same stage are connected to each other and respectively connected to a fifth electrode and a sixth electrode. The phase shifters covering the second output end of the optical-splitting element even-numbered of the same stage are connected to each other and respectively connected to a seventh electrode and an eighth electrode.

In one embodiment of the disclosure, each of the output ends of the phase shifters of the $k^{th}$ stage is respectively connected to an optical waveguide having a fine-tuning phase shifter in order to fine tune the phase of each of the output ends of the phase shifters in the $k^{th}$ stage.

In one embodiment of the disclosure, each of the output ends of the phase shifters of the $m^{th}$ stage is respectively connected to an optical waveguide having a fine-tuning phase shifter in order to fine tune the phase of each of the output ends of the phase shifters in the $m^{th}$ stage. The value m can be an integer between 1 and k. For an example, if m=k-2, each of the fine-tuning phase shifter can add the same phase to the four output ports at the $k^{th}$ stage that are following the fine-tuning phase shifter.

Most of semiconductor wafer manufacturing processes can provide a number of metal conductive wire layers for layout of metal wires to connect the transistors and avoid short circuit, so the phase shifters inside different phase shifters groups can be connected by different metal conductive wire layers.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The disclosure will become more fully understood from the detailed description given herein below and the accompanying drawings which are given by way of illustration only, and thus are not limitative of the disclosure and wherein.

DETAILED DESCRIPTION

Figure 1:
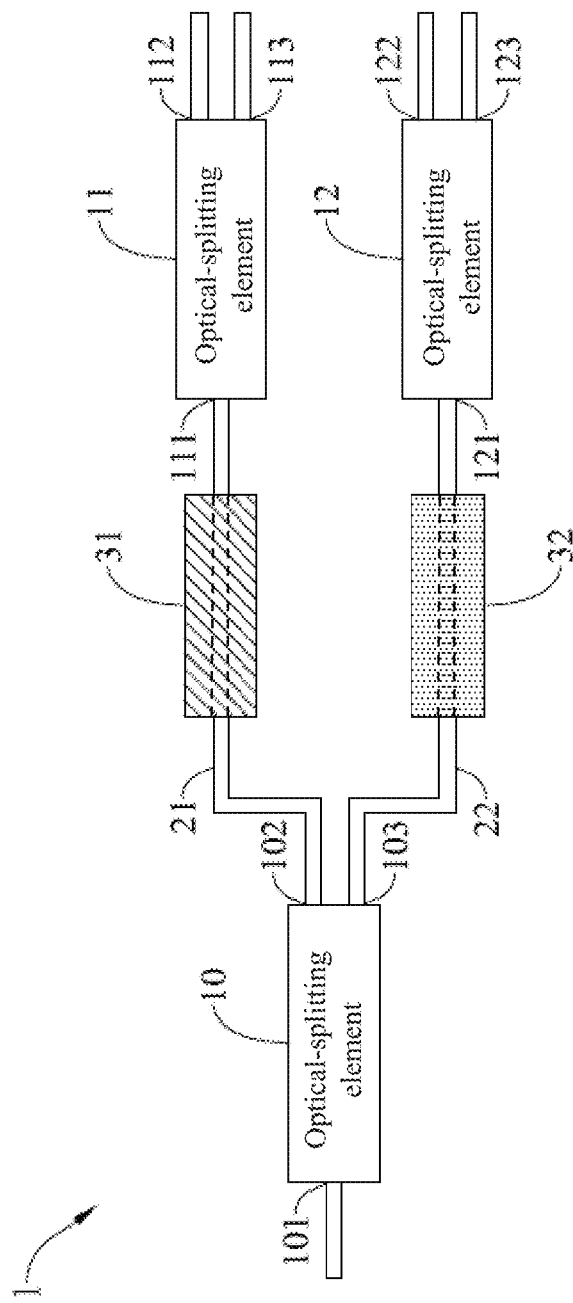
FIG. 1 is the schematic view of the structure of an adjustable optical phase shifter array in accordance with a first embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Please refer to FIG. 1, which is the schematic view of the structure of an adjustable optical phase shifter array in accordance with a first embodiment of the disclosure. As shown in FIG. 1, the adjustable optical phase shifter array 1 includes optical-splitting elements 10, 11, 12, a first optical waveguide 21, a second optical waveguide 22 and phase shifters 31, 32. The optical-splitting element 10 has an input end 101, a first output end 102 and a second output end 103. The optical-splitting element 11 has an input end 111, a first output end 112 and a second output end 113. The optical-splitting element 12 has an input end 121, a first output end 122 and a second output end 123. The first optical waveguide 21 is connected to and disposed between the first output end 102 and the input end 111. The second optical waveguide 21 is connected to and disposed between the second output end 102 and the input end 121. The first phase shifter 31 covers the first optical waveguide 21 and the second phase shifter 32 covers the second optical waveguide 22. For convenient description, the electrodes, metal conductive wires and heaters of the first phase shifter 31 and the second phase shifter 32 are not shown in FIG. 1.

Figure 2:
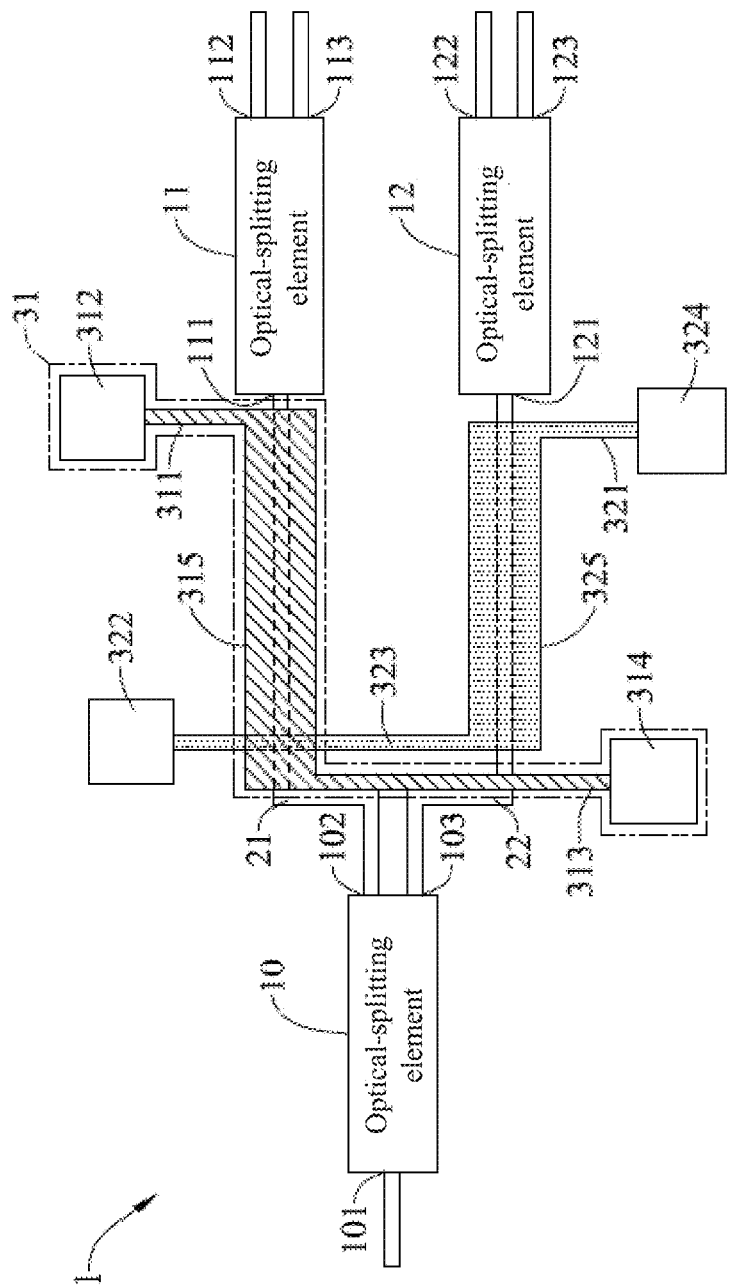
FIG. 2 is the schematic view of the details of the structure of the adjustable optical phase shifter array in accordance with the first embodiment of the disclosure.

Please refer to FIG. 2, which is the schematic view of the details of the structure of the adjustable optical phase shifter array in accordance with the first embodiment of the disclosure. As shown in FIG. 2, the adjustable optical phase shifter array further includes phase shifters alternatively connected to electrodes, which can control the phases of the optical waveguides adjacent to or under the phase shifters via metal conductive wires. The first phase shifter 31 includes a first metal wire 311, a first electrode 312, a second metal conductive wire 313, a second electrode 314, and a first heater 315. More specifically, the first heater 315 covers the optical waveguide 21. One end of the first heater 315 is electrically connected to the first electrode 312 via the first metal conductive wire 311 and the other end of the first heater 315 is electrically connected to the second electrode 314 via the second metal conductive wire 313. The first electrode 312 and the second electrode 314 may be connected to two output ports of a driving or control circuit.

The second phase shifter 32 includes a third metal conductive wire 323, a third electrode 322, a fourth metal conductive wire 321, a fourth electrode 324 and a second heater 325. More specifically, the second heater 325 covers the optical waveguide 22. One end of the second heater 325 is electrically connected to the third electrode 322 via the third metal conductive wire 323 and the other end of the second heater 325 is electrically connected to the fourth electrode 324 via the third meal conductive wire 321. The third electrode 322 and the fourth electrode 324 may be connected to two output ports of a driving or control circuit. In some embodiments, the electric powers applied to the first phase shifter 31 and the second phase shifter 32 may be equal to or different from each other.

Figure 3:
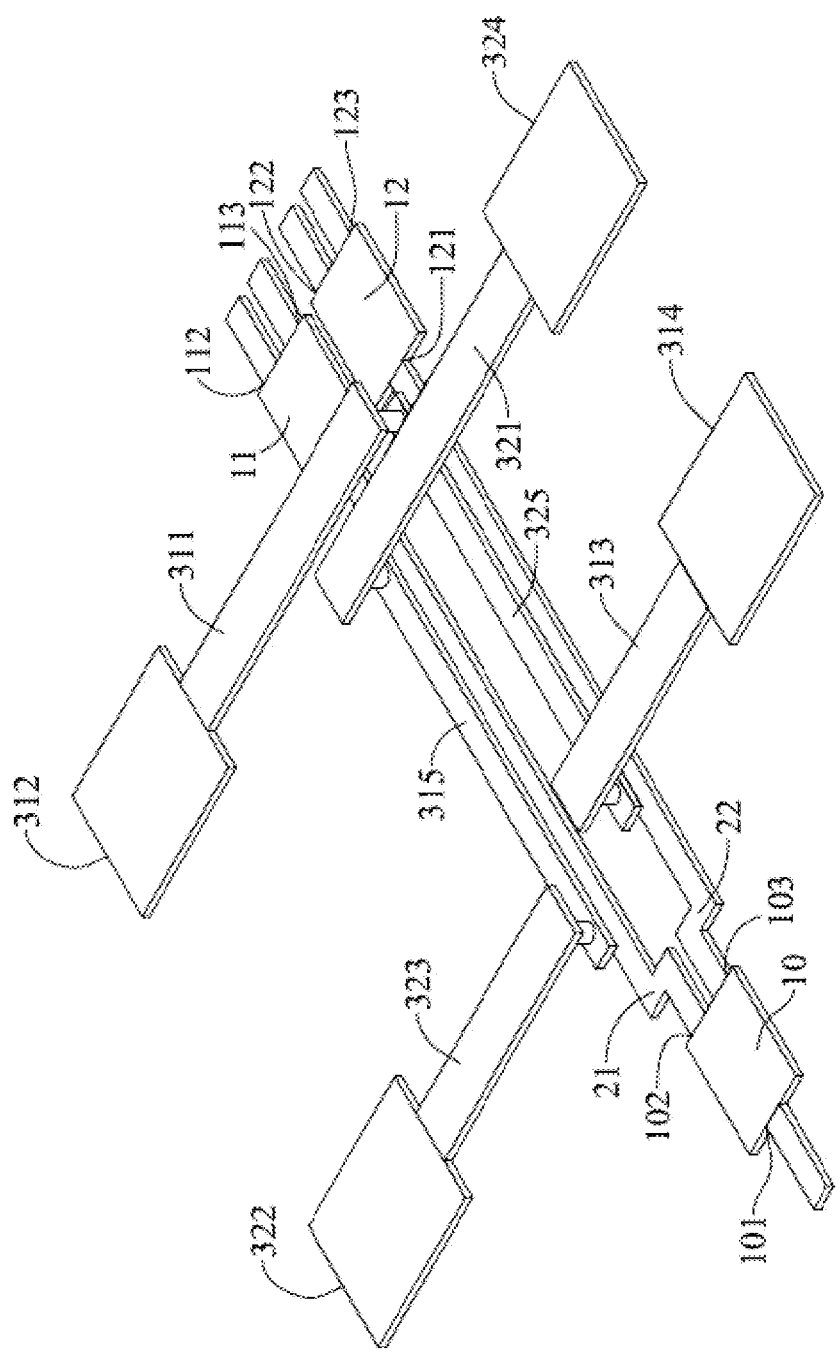
FIG. 3 is the schematic view of the 3D structure of the adjustable optical phase shifter array in accordance with the first embodiment of the disclosure.

Most of semiconductor wafer manufacturing processes can provide a plurality of metal conductive wire layers for disposing metal conductive wires alternating with each other, so two different metal conductive wires layers can be used to connect to two phase shifters respectively. Please refer to FIG. 3, which is the schematic view of the 3D structure of the adjustable optical phase shifter array in accordance with the first embodiment of the disclosure. The first metal conductive wire 311 and the fourth metal conductive wire 321 are disposed in different metal conductive wires. The second metal conductive wire 313 and the third metal conductive wire 323 are disposed in different metal conductive wire layers in order to prevent from short-circuit.

The aforementioned optical-splitting elements may be optical splitters, which is an element capable of splitting one beam into two beams; the strength of each of the split beams is 50% of that of the original beam. Further, the input end 101 of the aforementioned optical-splitting element 10 is used to receive an input optical signal (not shown in the drawings).

When the temperature of the first heater 315 increases, the thermal-optic effect generated by the first optical waveguide 21 changes the effective refraction index of the first optical waveguide 21. Thus, the beam moving in the first optical waveguide 21 can generate a corresponding phase delay according to the equation, Phase=$2*\pi*(\Delta neff)*L/lambda$. In this equation, "Phase" stands for the phase delay; "$\Delta neff$" stands for the change of the effective refraction index of the optical waveguide; "L" stands for the length of the heater; "lambda" stands for the wavelength of the beam. The phase shifters disposed in these stages can generate phase delays. The phase differences of the optical waveguides for outputting in the last stage of the adjustable optical phase shifter array increase according to an arithmetic series. If these optical waveguides for outputting are connected to an array-type periodic structure capable of outputting beams from the surface of a chip via diffraction, the structure can generate beams via far-field interference and the angles of the beams can be rotated by phase delay. If these optical wavelengths for outputting are connected to a photo-electric conversion component and further connected to a microwave antenna array, the structure can form microwave beams in the far field and the angles of the microwave beams can be rotated via phase delay.

The adjustable optical phase shifter array according to the embodiment of the disclosure can connect the optical-splitting elements to the phase shifters in series. For example, the number of the series-connection stages is k and k is a positive integer. The number of the optical-splitting elements of the adjustable optical phase shifter array is n and n is a positive integer equal to or above 1. Regarding the optical-splitting elements of the $1^{st}$~$k^{th}$ stages, the number of the optical-splitting elements of each of the stages is increased by power of 2 (e.g., $2^k$). The output end of each optical-splitting element is connected to 2 optical waveguides and 2 phase shifters. In addition, among the phase shifters of the $1^{st}$~$k^{th}$ stages, it is possible to adjust the number of the phase shifters needed for each optical waveguide between any two of the optical-splitting elements according to design requirements. The series connection structure is as shown in FIG. 4.

Figure 4:
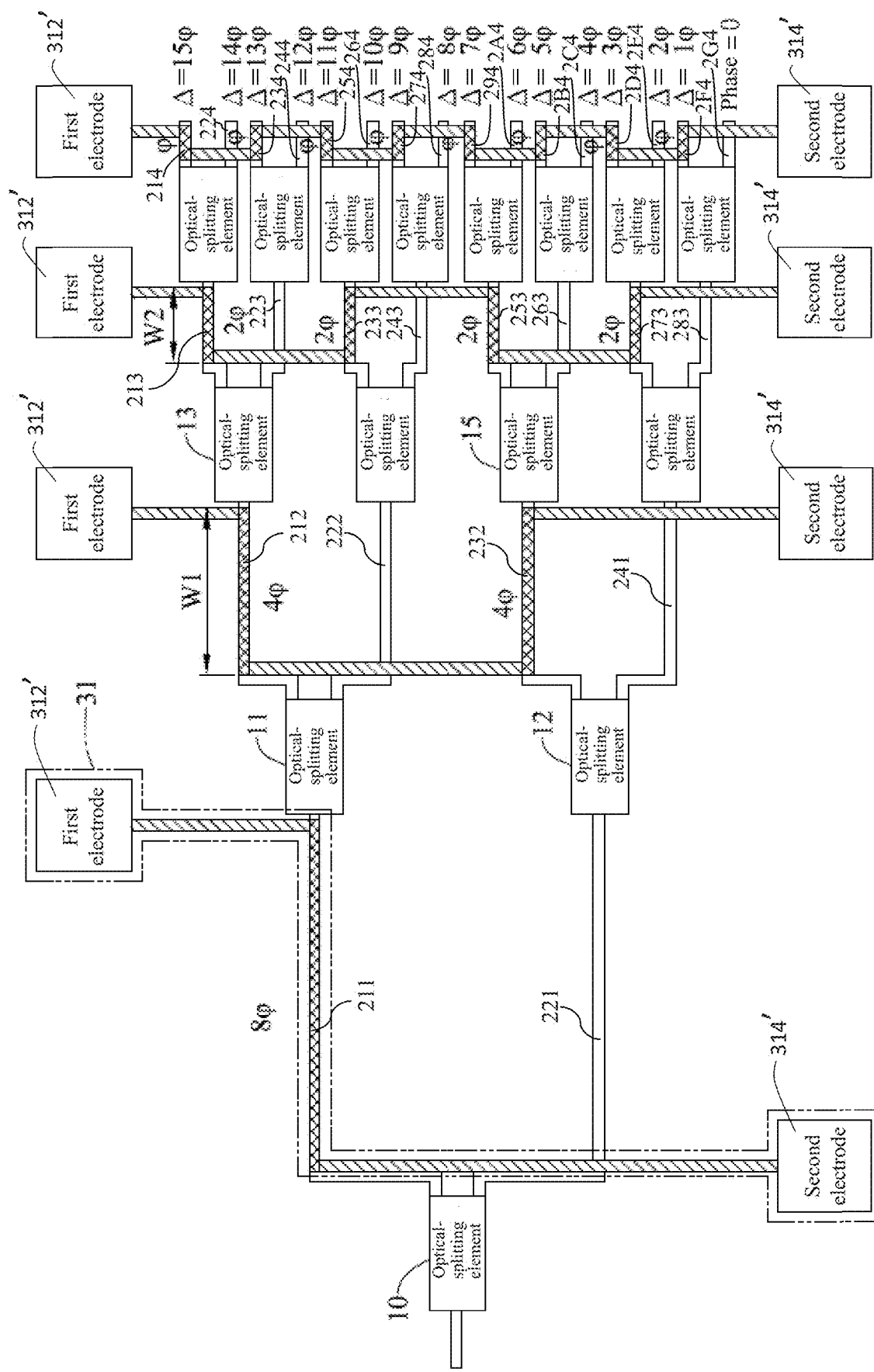
FIG. 4 is the schematic view of the structure of an adjustable optical phase shifter array in accordance with a second embodiment of the disclosure.

Please refer to FIG. 4, which is the schematic view of the structure of an adjustable optical phase shifter array in accordance with a second embodiment of the disclosure. FIG. 4 illustrates an adjustable optical phase shifter array having the structure of 4-stage series connection. For convenient description, this embodiment illustrates only 3 stages of the structure of 4-stage series connection.

The first output end of each optical-splitting element is connected to the input end of the optical-splitting element of the next stage and each first optical waveguide is covered by the first heater of the first phase shifter 31. More specifically, the first output end of the optical-splitting element 11 is connected to the input end of the optical-splitting element 13 via the first optical waveguide and provided with the first heater. The first output end of the optical-splitting element 12 is connected to the input end of the optical-splitting element 15 via the first optical waveguide and provided with the first heater. In other words, each first heater is disposed between the input end of the optical-splitting element odd-numbered and the first output end of the optical-splitting element of the previous stage, and the first heaters of each stage are connected to the first electrode 312' and the second electrode 314' in series via the metal conductive wires. Via this structure, the first heaters, metal conductive wires, first electrode 312' and second electrode 314' connected to each other in series can form a phase shifter group. Moreover, the optical-splitting elements and the phase shifters of the fourth stage or the stages following the fourth stage are also connected to each other in series by the same way.

It is worthy to point out that the length of the first heater of the phase shifter of the next stage is less than the length of the first heater of the phase shifter of the previous stage. For example, the length W2 of the first heater of the phase shifter of the third stage is less than the length W1 of the first heater of the phase shifter of the second stage.

The first phase shifter 31, the second phase shifter 32 and the phase shifters of the following stages are thermal-resistance type phase shifters. In other words, thermal-resistance type heaters are disposed to be adjacent to the waveguides of the phase shifters; the heaters may be meal conductive wires having high resistance or linear semiconductors. As the resistances of the metal conductive wires connected to the phase shifters are low, the resistance between the electrodes of the first stage is mainly provided by the heaters. The total lengths of the heaters of the first phase shifters of all stages are substantially equal to each other, so the resistances of the first phase shifters of all stages are also substantially equal to each other. Similarly, the resistances of the first phase shifters and the second phase shifters are also substantially equal to each other. More specifically, the total resistance of the phase shifters of the first stage is substantially equal to that of the phase shifters of the second stage.

Figure 6A:
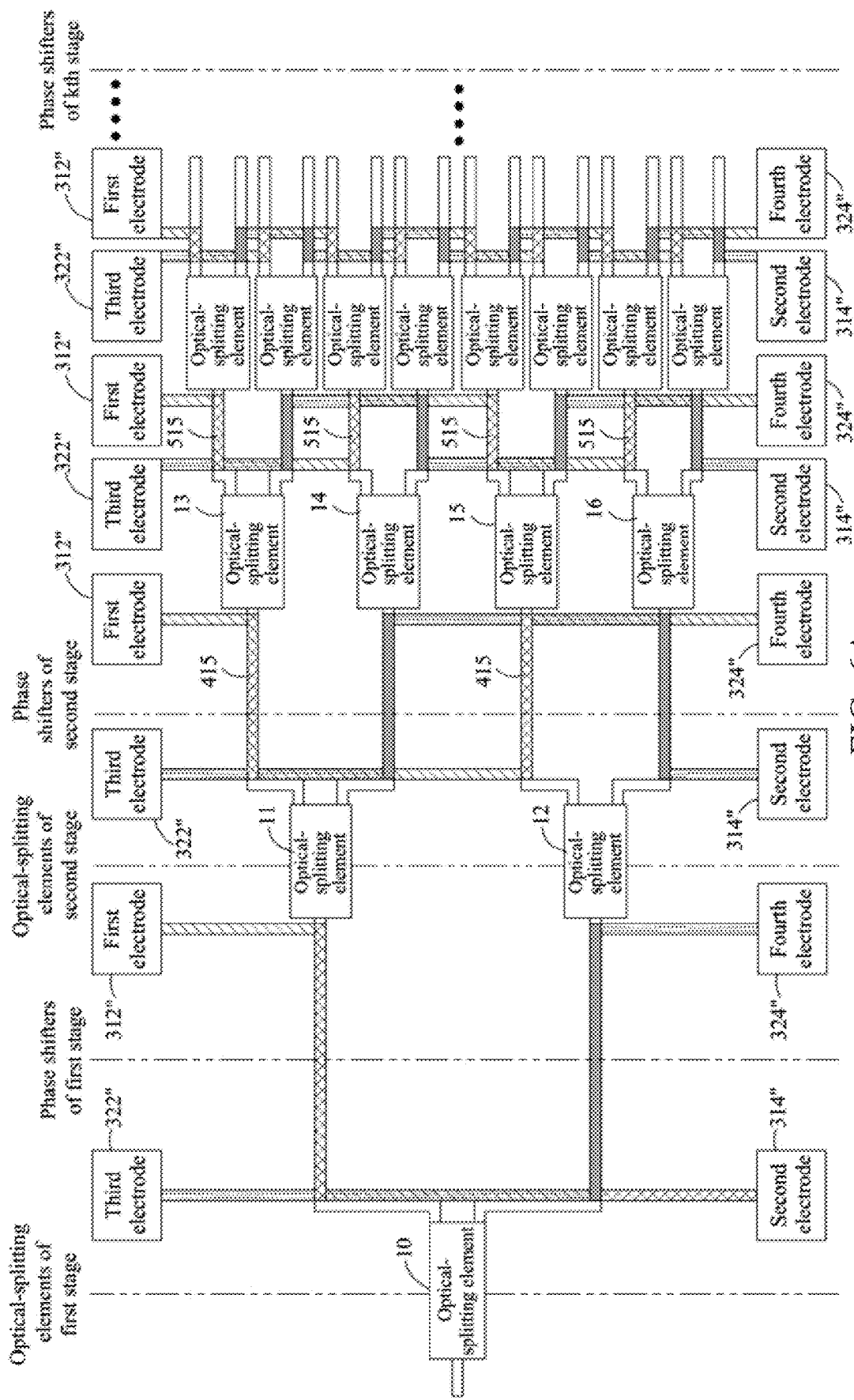
FIG. 6A is the schematic view of the structure of an adjustable optical phase shifter array in accordance with a third embodiment of the disclosure.

Please refer to FIG. 4 and FIG. 6A. In FIG. 4, the phase shifters are labeled $2xy$ (including 211, 221, 212, 222, 232, 241, 213, 223, 233, 243, 253, 263, 273, 283, 214, 224, 234, 244, 254, 264, 274, 284, 294, 2A4, 2B4, 2C4, 2D4, 2F4, 2G4); y stands for this stage being the $y^{th}$ stage and x stands for this phase shifter being the $x^{th}$ phase shifter in this stage. For instance, the phase shifter 232 is the $3^{rd}$ phase shifter in the second stage. In the first stage, the resistance of the first heaters 415 of the phase shifters is 8R. In the second stage, the resistance of each of the two first heaters 515 of the phase shifters is 4R, so the total resistance is 8R. According to the above regular pattern, the total resistance of the phase shifters of the first stage is 8R. The total resistance of the phase shifters of the second stage is the sum of the resistances of 2 identical heaters (4R+4R=8R). The total resistance of the phase shifters of the third stage is the sum of the resistances of 4 identical heaters (2R+2R+2R+2R=8R). If the phase shifters of the fourth stage are included, the total resistance of the phase shifters of the fourth stage is the sum of the resistances of 8 identical heaters (1R+1R+1R+1R+1R+1R+1R+1R=8R). That is to say, the total resistances of the phase shifters of all stages are substantially equal to each other. Besides, the total lengths of the phase shifters of all stages are also substantially equal to each other.

As set forth above, the total resistances of the heaters of all stages are equal to each other. Thus, when a digital-to-analog converter is used to output the current needed by the heaters, the temperature control precision thereof can be increased on the condition that the load is stable. In addition, the series connection design allows the phase shifters of each stage to use only two electrodes, which significantly reduces the number of the electrodes and decrease the size of the semiconductor chip so as to lower the manufacturing cost. Besides, the packaging of the adjustable optical phase shifter array according to the embodiment of the present invention is also convenient. Further, the traces of the circuits on the circuit board of the adjustable optical phase shifter array are simple, which can reduce the size of the circuit board and decrease the number of the DAC chips. Therefore, the manufacturing cost of the whole module can be dramatically decreased.

Regarding the phase control of the antenna of each optical waveguide, the phase of the beam of each optical waveguide can be delayed by the temperature provided by the aforementioned metal-heating type phase shifters, with the resistance of a multiple of 2, of each stage so as to control the phase difference. The greater the resistance of the metal-heating type phase shifter is, the longer the length of the corresponding optical waveguide to be heated would be. Moreover, since the phase delay amount is in proportion to the length of the optical waveguide to be heated, the phase difference can be precisely controlled by using the DAC to control the heating output.

Please refer to the configuration of the phase shifters of the adjustable optical phase shifter array shown in FIG. 4. The embodiment takes the adjustable optical phase shifter array with the phase delay of 13φ (Phase change=13φ) shown in FIG. 4 as an example. After the optical signal passes through the first phase shifter, the phase thereof is delayed by 8φ. Then, the optical signal is transmitted to the phase shifter in the upper path of the first stage and the phase thereof is further delayed by 4φ. Afterward, the optical signal is transmitted to the lower path of the second stage and there is no phase shifter, so the phase delay thereof is 0. Finally, the optical signal is transmitted to the phase shifter in the upper path of the third stage, the phase thereof is further delayed by φ. Therefore, the total phase delay is 8φ+4φ+0+φ=13φ.

The embodiment further takes the optical waveguide with the phase delay of 7φ shown in FIG. 4 as an example. The optical signal is transmitted from the second output end of the optical-splitting element 10 to the optical-splitting element of the next stage and there is no phase shifter, so the phase thereof is not delayed. Next, the optical signal is transmitted from the first output end of the optical-splitting element 12 to the upper path of the optical-splitting element of the next stage and there is a phase shifter, so the phase thereof is delayed by 4φ. Then, the optical signal is transmitted to the phase shifter in the upper path of the next stage of the current stage and the phase thereof is delayed by 2φ. Afterward, the optical signal is transmitted to the phase shifter in the upper path of the next stage of the current stage and the phase thereof is further delayed by p. Therefore, the total phase delay is 0+4φ+2+φ=7φ. In this way, the phase array can generate array beams and the phase difference between the beams generated by any two, adjacent to each other, of the optical waveguides is p. The wavefronts of the array beams can form a superposed beam with high strength in the direction of the angle corresponding to the phase difference of p in order to achieve the object of beam steering.

To sum up, the embodiment of the present invention adds the phase shifter array in the space, for connecting to the optical waveguides, between one optical splitter and the optical splitter of the next stage so as to heat the optical waveguides via thermal-resistance effect. When the temperature increases, the thermal-optic effect of the optical waveguides can change the effective refraction index thereof, such that the beams moving in the optical waveguides can generate a corresponding phase delay according to the equation, Phase=2*π*(Δneff)*L/lambda. Via the phase differences, increasing based on an arithmetic series, between the beams of the adjacent optical waveguides, the array beams formed in the far field can achieve beam steering.

Figure 5:
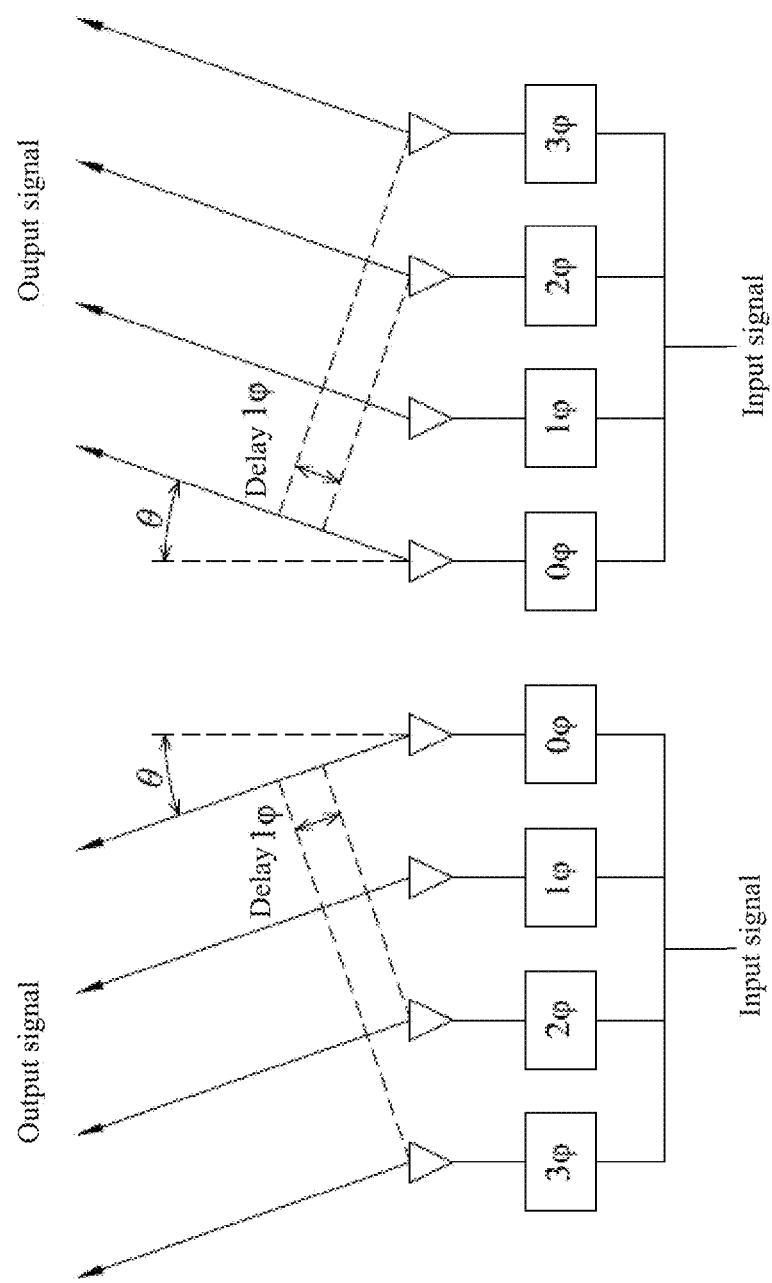
FIG. 5 is the schematic view of wavefront turning during phase adjustment in accordance with one embodiment of the disclosure.

Please refer to FIG. 5, which is the schematic view of wavefront turning during phase adjustment in accordance with one embodiment of the disclosure. As shown in FIG. 5, when phase adjustment is performed by heating or electro-optic effects in the third embodiment, the wavefronts of the beams can only travel leftward, as the antennas at the left side shown in FIG. 5. Accordingly, it is necessary to add a mirror-symmetric heater group (i.e., the second phase shifter) so as to solve the problem of turning only in one side. In this way, the wavefronts of the beams can travel rightward, as the antennas at the right side shown in FIG. 5.

Please refer to FIG. 6A, which is the schematic view of wavefront turning during phase adjustment in accordance with one embodiment of the disclosure. As shown in FIG. 6A, the first stage includes two optical-splitting elements. The second stage includes four optical-splitting elements. The third stage includes eight optical-splitting elements. The number of the optical-splitting elements of the $n^{th}$ stage is increased by power of 2; n is an integer equal to or above 1. In addition, the optical-splitting element 10 may be considered as the optical-splitting element of the 0 stage. Each of the optical-splitting elements has an input end, a first output end and a second output end. The phase shifters of the $1^{st} \sim k^{th}$ stages respectively cover the first optical waveguides to form a first phase shifter group. The first phase shifter group makes the optical signal passing through the first optical wave guides generate a phase shift by heating or electro-optic effects; k is a positive integer. Moreover, the phase shifters of the $1^{st} \sim k^{th}$ stages respectively cover the second optical waveguides to form a second phase shifter group. The second phase shifter group makes the optical signal passing through the second optical wave guides generate a phase shift by heating or electro-optic effects. The phase shift generated by the second phase shifter is different from or reverse to the phase shift generated by the first phase shifter group.

Figure 6B:
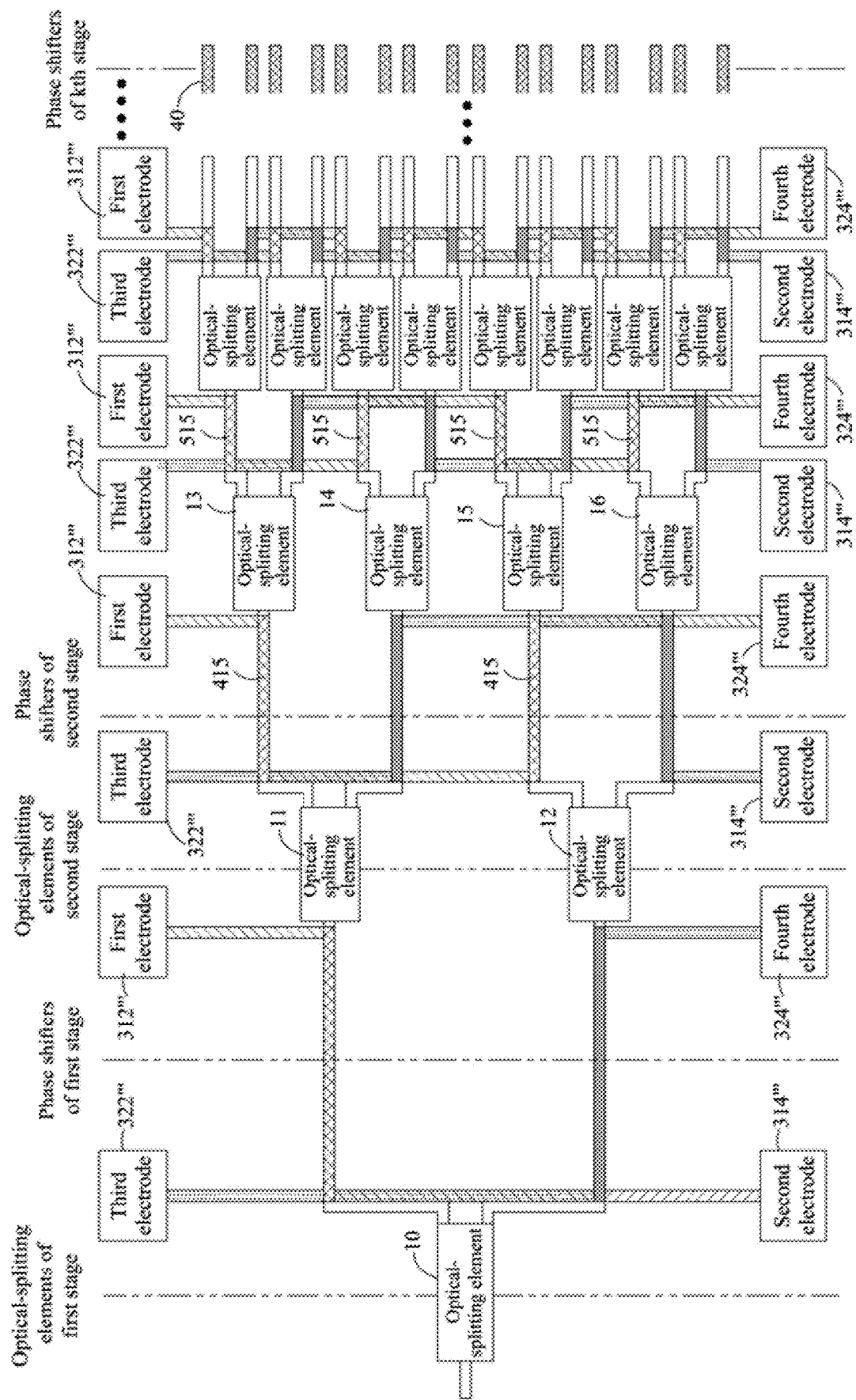
FIG. 6B is the schematic view of the structure of an adjustable optical phase shifter array in accordance with a fifth embodiment of the disclosure.

Please refer to FIG. 6B, which is the schematic view of the structure of an adjustable optical phase shifter array in accordance with a fifth embodiment of the disclosure. The difference between the fourth embodiment and the third embodiment is that each of the output ends of the phase shifters of the kV stage is further connected to an optical waveguide having a fine-tuning phase shifter 40 in order to fine tune the phase of each of the output ends. In the fourth embodiment, when performing scanning via beam steering, the adjustable optical phase shifter array can rotate the beams by using the phase errors generated by the calibration process of the fine-tuning phase shifters 40 first and then using the phase shifts between the waveguides corresponding to the rotated angles generated by the phase shifters of the $1^{st} \sim k^{th}$ stages. As the fine-turning phase shifters 40 only need to calibrate the phase errors, so the amount of the phase shifts needed to be adjusted is relatively low. Thus, the power consumption thereof can be lower.

In general, semiconductor devices have the interconnection structure of multiple metal layers. Thus, in this embodiment, the first phase shifter group is disposed on the first metal layer and the metal conductive wires of the second phase shifter group are disposed on the second layer. The pad layer can serve as the electrode. The layers can be connected to each other by vias. In this way, two independent heater groups can be arranged to be closely adjacent to each other. Further, when one of the heater groups is performing phase adjustment by heating or electro-optic effects, the other one can serve as the fine-tuning control group. Thus, the two groups can cooperate with each other in order to optimize phase control. It is worthy to note that the length of the first heater of the phase shifter in the next stage is less than that of the first heater of the phase shifter in the previous stage. The length of the second heater of the phase shifter in the next stage is less than that of the second heater of the phase shifter in the previous stage. The length of the first heater is substantially equal to that of the second heater in the same stage.

Figure 7:
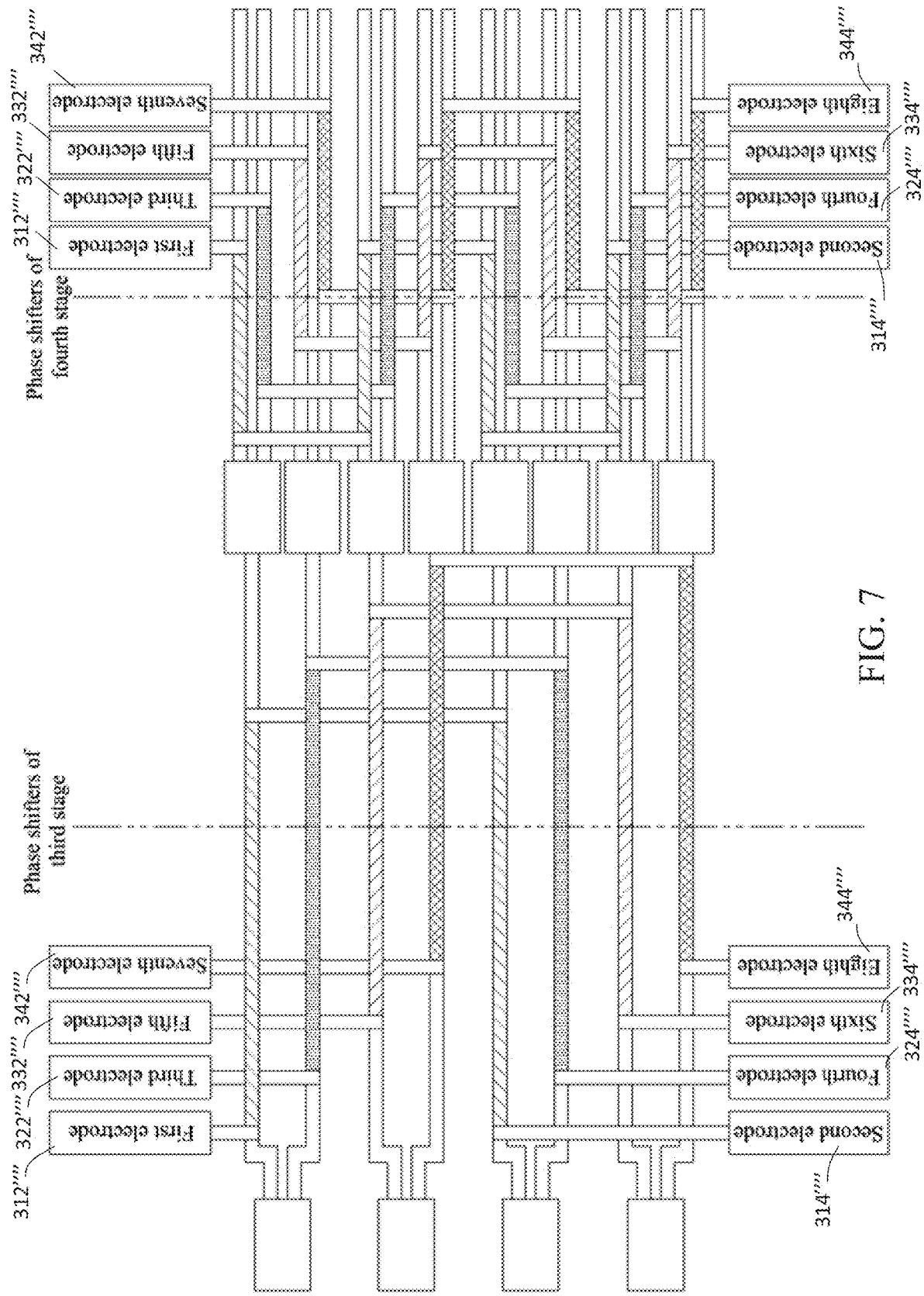
FIG. 7 is the illustration of a 4-stage adjustable optical phase shifter array in accordance with one embodiment of the disclosure; the rear stage of the optical phase shifter array has a plurality of phase shifter groups.

Please refer to FIG. 7, which is the illustration of a 4-stage adjustable optical phase shifter array in accordance with one embodiment of the disclosure; the rear stage of the optical phase shifter array has a plurality of phase shifter groups. The embodiment showed in FIG. 7 includes four control electrode groups for the phase shifters of the third stage and the fourth stage. The first phase shifter group is connected to the first electrode 312'''' and the second electrode 314'''' via metal conductive wires. The second phase shifter group is connected to the third electrode 322'''' and the fourth electrode 324'''' via metal conductive wires. The third phase shifter group is connected to the fifth electrode 332'''' and the sixth electrode 334'''' via metal conductive wires. The fourth phase shifter group is connected to the seventh electrode 342'''' and the eighth electrode 344'''' via metal conductive wires. More specifically, the phase shifters covering the first output ends of the optical-splitting elements odd-numbered are connected to each other in series and further respectively connected to the first electrode 312'''' and the second electrode 314''''. The phase shifters covering the second output ends of the optical-splitting elements odd-numbered are connected to each other in series and further respectively connected to the third electrode 322'''' and the fourth electrode 324''''. The phase shifters covering the first output ends of the optical-splitting elements even-numbered are connected to each other in series and further respectively connected to the fifth electrode 332'''' and the sixth electrode 334''''. The phase shifters covering the second output ends of the optical-splitting elements even-numbered are connected to each other in series and further respectively connected to the seventh electrode 342'''' and the eighth electrode 344''''.

Similarly, each of the phase shifter groups of the fourth stage is connected to the electrode group corresponding thereto. In this way, the phases of the optical waveguides can be respectively controlled by the elements odd-numbered and the elements even-numbered in order to fine tune the small process variations. Therefore, the adjustable optical phase shifter array can achieve high precision by lower power consumption.

Accordingly, after the configuration of the heaters has been redesigned and simplified, the size of the chip can be decreased because the numbers of the electrodes and the traces of the circuit board are significantly reduced. Besides, the number of the DACs used in the chip is also reduced, which can further decrease the complexity and the size of the chip. The inventors have produced several test chips and the performance of the test chips can prove that the designs of the adjustable optical phase shifter arrays according to the embodiments of the prevent invention are completely feasible and of high practical utility.

LiDAR technology is to radiate a beam to the environment to obtain the echo of the beam so as to swiftly collect 3D images with high resolution. With the development of integrated silicon photonics devices, LiDARs achieving beam steering technology via phased arrays can be easily realized by silicon semiconductor manufacturing process. The key components for controlling beam steering are phase shifters of adjustable optical phase shifter arrays, which can determine the angle resolution, angle range and velocity of performing scanning via beams. Thus, phase shifters play an important role in the improvement of the performance of LiDAR systems.

Further, the difficulty of designing phase shifters is to independently control the phase of each of the optical waveguides of the antennas; the control complexity thereof is proportional to the number of the phased optical waveguides. Although the configuration of cascade series connection can reduce the number of the components needed, it is necessary to use direct couplers for light splitting and accurately balancing the optical path differences of the optical waveguides of the antennas, which significantly increases the difficulty of designing optical paths and the requirements of semiconductor manufacturing technologies. By contrast, the design of the adjustable optical phase shifter arrays according to the embodiments of the present invention can increase the heaters by power of 2 in order to control the adjustable optical phase shifter arrays, which can effectively prevent the adjustment precision from being influenced by the heaters interfering with each other because the heaters are closely spaced. The design further adopts the series connection configuration of resistors and the number of the resistors are increased by power of 2, such that the resistances of the control units are substantially equal to each other with a view to make sure that the DACs can have great control accuracy.

Moreover, if wafer factories can control the process variations with a certain range, it is possible to fine tune the phases of the beams by fine tuning the heaters via extremely low power consumption so as to compensate for the small phase errors caused by the process variations. Combining the coarse-tuning mechanism and the fine-tuning mechanism can achieve great balance between design complexity and precise control.

The designs according to the embodiments of the present invention can realize the optical phase shifter arrays via the standard CMOS semiconductor manufacturing process. Regarding the material of the heaters, any metal connection layers in the manufacturing process can serve as the heating elements, but it is necessary to take the overall resistance into consideration. The line widths of the conductive wires and the heaters should be accurately calculated so as to make sure that the resistance ratio can have obvious difference.

One of the objectives of the present invention is to provide an optical phase shifter array combining two optical phase shifter arrays for coarse-tuning and fine-tuning with each other. The optical phase shifter array for coarse tuning can provide thermal energy to the heaters based on a quadratic multiplied mode so as to adjust the phase delay sequence of the beam of the optical waveguide in each channel and performing swift beam scanning. Then, the fine-tuning phase shifters in the final stage are used to calibrate the phase errors caused by the manufacturing process. The optical phase shifter array according to the embodiments of the present invention can performing swift beam scanning and has the advantage of simplifying the layout of the array. In addition, the optical phase shifter array for fine tuning can assist in fine tuning the small process variations, so the optical phase shifter array can achieve high precision by lower power consumption.

Moreover, one embodiment of the present invention can combine two optical phase shifter arrays for fine turning and coarse tuning with each other. The optical phase shifter array for coarse tuning can provide thermal energy to the heaters based on a quadratic multiplied mode so as to adjust the phase delay sequence of the beam of the optical waveguide in each channel via thermal-optic effect. The optical phase shifter array for fine tuning can provide compensation for the slight phase errors due to the manufacturing process of the optical waveguides and non-uniform temperature distribution. After combining the two optical phase shifter arrays with each other, the adjustable optical phase shifter array according to the embodiment of the present invention can significantly reduce the number of the electrodes and retain excellent digital-to-analog precision, but simultaneously keep great adjustment performance. For the applications needing high-precision control, it is possible to fine tune the phases of the beams by fine tuning the heaters via extremely low power consumption with a view to accurately control the phases of the beams.

Figure 8:
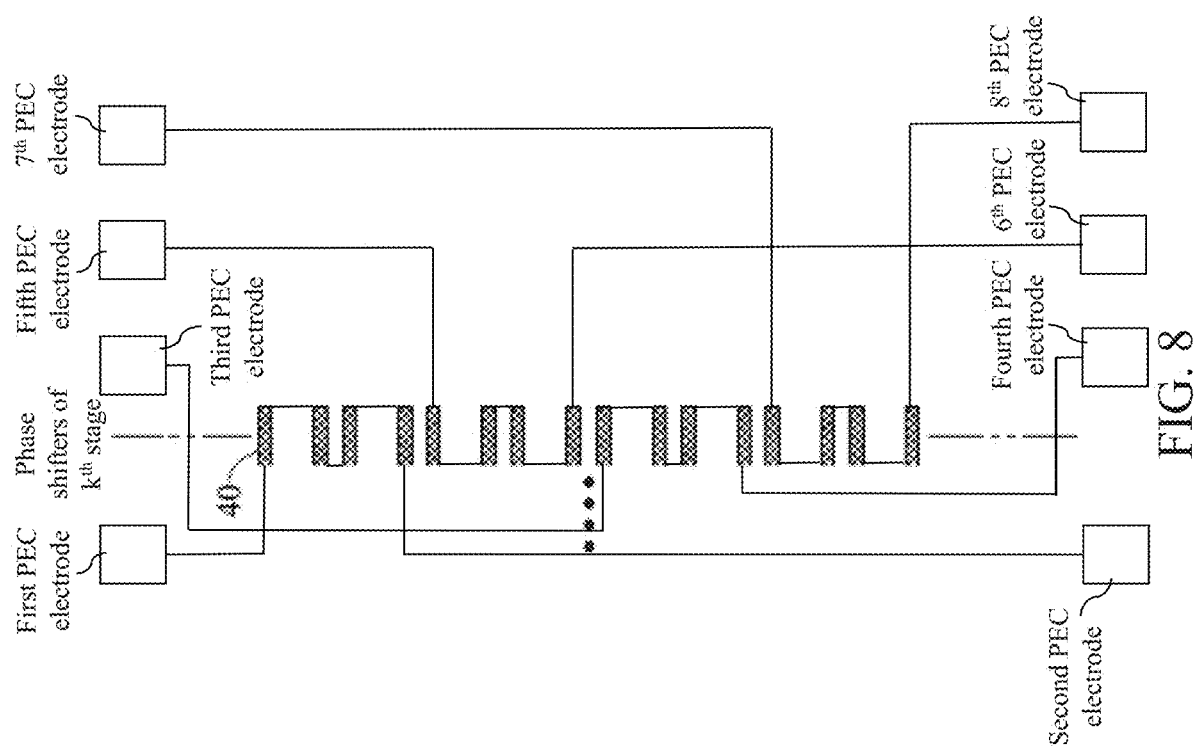
FIG. 8 is the schematic view of the structure of an adjustable optical phase shifter array in accordance with one embodiment of the disclosure.

Please refer to FIG. 8, which is the schematic view of the structure of an adjustable optical phase shifter array in accordance with one embodiment of the disclosure. As shown in FIG. 8, the last stage of the optical phase shifter array has additional fine-tuning phase shifters connected to form a plurality of fine-tuning phase shifter groups. In this embodiment, these additional fine-tuning phase shifters include a first PEC electrode, a second PEC electrode, a third PEC electrode, a fourth PEC electrode, a fifth PEC electrode, a $6^{th}$ PEC electrode, a $7^{th}$ PEC electrode and $8^{th}$ PEC electrode.

Figure 9:
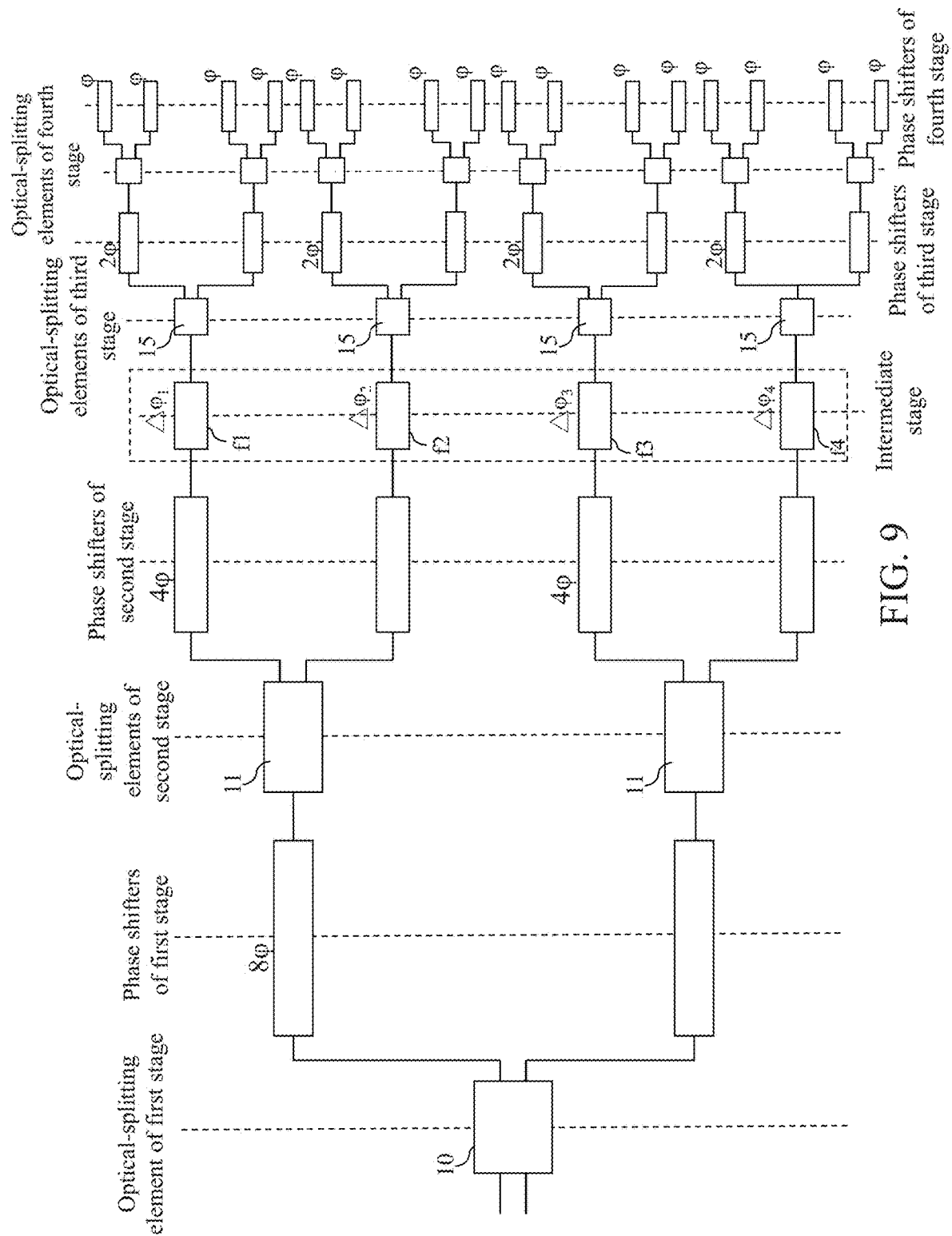
FIG. 9 is the schematic view of the structure of an adjustable optical phase shifter array in accordance with one embodiment of the disclosure.

Please refer to FIG. 9, which is the schematic view of the structure of an adjustable optical phase shifter array in accordance with one embodiment of the disclosure. As shown in FIG. 9, the intermediate stage of the optical phase shifter array has additional fine-tuning phase shifters, f1($\Delta\varphi_1$), f2($\Delta\varphi_2$), f3($\Delta\varphi_3$), f4($\Delta\varphi_4$).

Figure 10:
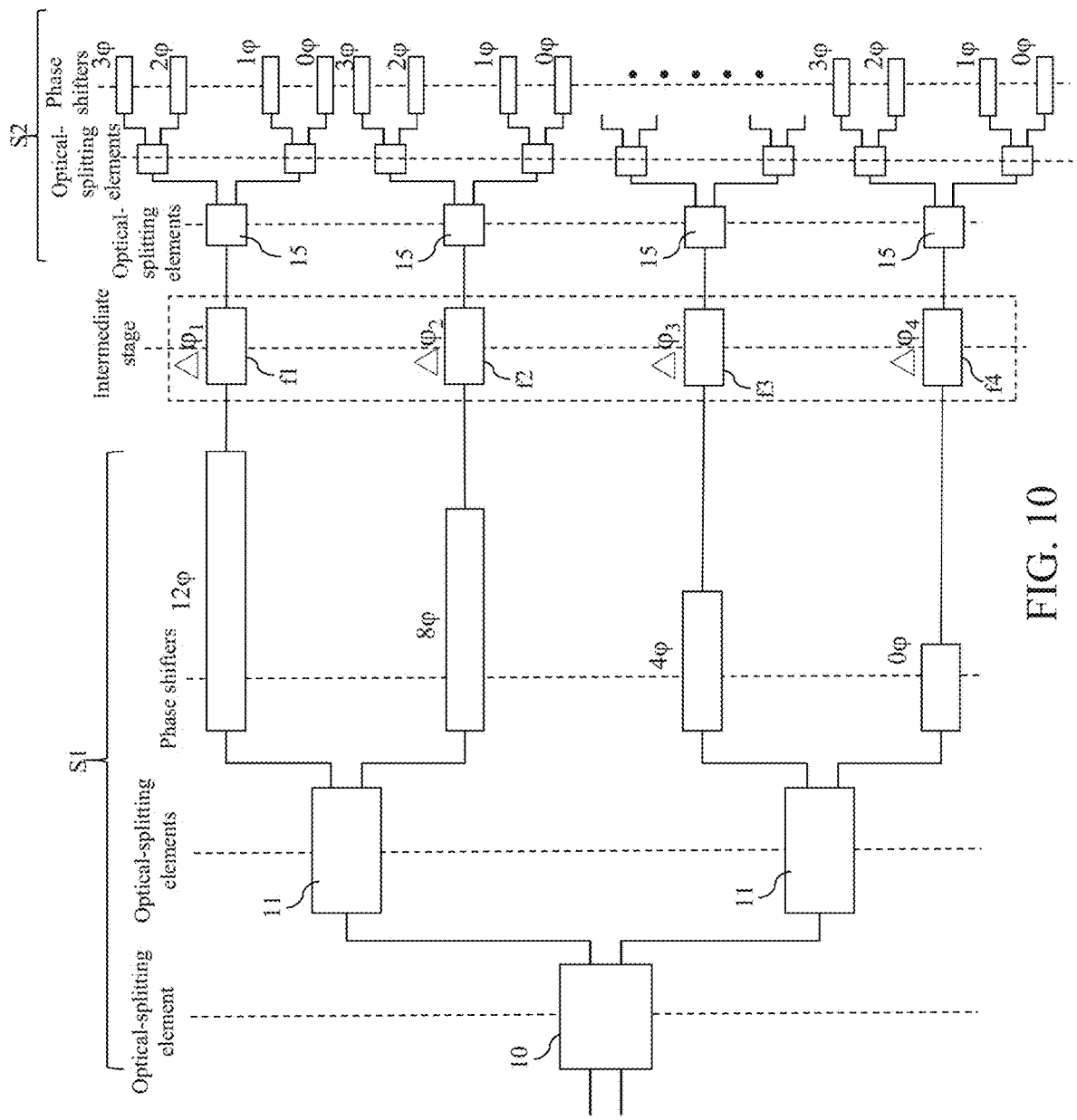
FIG. 10 is the schematic view of the structure of an adjustable optical phase shifter array in accordance with one embodiment of the disclosure.

Please refer to FIG. 10, which is the schematic view of the structure of an adjustable optical phase shifter array in accordance with one embodiment of the disclosure. As shown in FIG. 10, the phase shifters of the $1^{st}$~$k^{th}$ stages of the optical phase shifter array may be divided into two sets, the first set S1 and the second set S2. The first set S1 may include one or more stages of the $1^{st}$~$k^{th}$ stages. The first set S1 provides the phase shift of the stage(s) thereof before the intermediate stage. In this embodiment, the first set S1 includes two stages of optical-splitting elements and one stage of phase shifters. In another embodiment, the first set S1 may include more than two stages of optical-splitting elements and phase shifters. As set for the above, the intermediate stage of the optical phase shifter array includes a plurality of fine-tuning phase shifters, f1, f2, f3, f4. In another embodiment, the first set S1 may include two or more stages. The second set S2 may include the other stage(s) of the $1^{st}$~$k^{th}$ stages. The second set S2 provides the phase shift of the stages thereof after the intermediate stage. In this embodiment, the second set S2 includes two stages of optical-splitting elements and one stage of phase shifters. In another embodiment, the second set S2 may include more than two stages of optical-splitting elements and phase shifters.

To sum up, the adjustable optical phase shifter array according to the embodiments of the present invention can combine two optical phase shifter arrays for fine turning and coarse tuning with each other. The optical phase shifter array for coarse tuning can provide thermal energy based on a quadratic multiplied mode so as to adjust the phase delay sequence of the beam of the optical waveguide in each channel. Therefore, the number of the thermal phase shifters can be reduced in order to prevent from thermal crosstalk due to the concentration of heat and reduce the area, of the chip, occupied by the electrodes. Besides, the optical phase shifter array for fine tuning can assist in fine tuning the small process variations. Thermal crosstalk due to the concentration of heat will not occur even if these elements are arranged to be close to each other. Thus, the adjustable optical phase shifter array combines the two complementary designs with each other, so can achieve high-precision adjustment and control performances.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. An adjustable optical phase shifter array, having optical-splitting elements of a plurality of stages and phase shifters of a plurality of stages connected thereto in series so as to evenly distribute an input light to a plurality of optical waveguides which are phase-adjustable, wherein the adjustable optical phase shifter array comprises:

$1^{st}$~$n^{th}$ optical-splitting elements, wherein each has an input end, a first output end and a second output end, wherein the input end of the $1^{st}$ optical-splitting element receives the input light and evenly distributes an optical signal of the input light to the optical-splitting element of a next stage, and n is an integer equal to or above 1;

a plurality of first optical waveguides, respectively connected to the input ends of the optical-splitting elements odd-numbered of the next stage and the first output ends of the optical-splitting elements of a previous stage so as to receive the optical signal;

a plurality of second optical waveguides, respectively connected to the input ends of the optical-splitting elements even-numbered of the next stage and the second output ends of the optical-splitting elements of the previous stage so as to receive the optical signal; and phase shifters of $1^{st}$~$k^{th}$ stages, respectively covering the first optical waveguides to form a first phase shifter group, wherein the first phase shifter group makes the optical signal passing through the first optical wave guides generate a phase shift by heating or electro-optic effects, and k is a positive integer, wherein the first phase shifter group comprises:

a first electrode;

a first metal conductive wire, connected to the first electrode;

a first heater, covering the first optical waveguides, wherein one end of the first heater is connected to the first metal conductive wire;

a second electrode; and a second metal conductive wire, respectively connected to the second electrode and the other end of the first heater;

wherein the optical-splitting elements of each stage are provided with the phase shifter of one stage disposed therebetween, wherein a number of the optical-splitting elements in each stage is increased by power of 2 and a length of the first heater of the phase shifters of the next stage is less than the length of the first heater of the phase shifters of the previous stage, wherein the phase shifters of the $1^{st}$~$k^{th}$ stages further respectively cover the second optical waveguides to form a second phase shifter group, and make the optical signal passing through the second optical waveguides generate the phase shift by heating or electro-optic effects, wherein the second phase shifter group comprises:
a third electrode;
a third metal conductive wire, connected to the third electrode;
a second heater, covering the second optical waveguides, wherein one end of the second heater is connected to the third metal conductive wire;
a fourth electrode; and
a fourth metal conductive wire, respectively connected to the fourth electrode and the other end of the second heater.

2. The adjustable optical phase shifter array of claim 1, wherein the phase shifter preceding the input end of the optical-splitting element odd-numbered and covering the first optical waveguides is electrically connected to the second electrode via the second metal conductive wire.

3. The adjustable optical phase shifter array of claim 1, wherein total lengths of the phase shifters of all of the sages are substantially equal to each other.

4. The adjustable optical phase shifter array of claim 1, wherein the phase shift generated by the second phase shifter is different from or reverse to the phase shift generated by the first phase shifter group.

5. The adjustable optical phase shifter array of claim 1, wherein the metal conductive wires of the first phase shifter group and the metal conductive wires of the second phase shifter group are disposed on different metal conductive wire layers.

6. The adjustable optical phase shifter array of claim 1, wherein the first heater and the second heaters are metal conductive wires having higher resistance or linear semiconductors.

7. The adjustable optical phase shifter array of claim 1, wherein the phase shifter preceding the input end of the optical-splitting element even-numbered and covering the second optical waveguides is electrically connected to the fourth electrode via the fourth metal conductive wire.

8. The adjustable optical phase shifter array of claim 1, wherein the phase shifters covering the first output end of the optical-splitting element odd-numbered of the same stage are connected to each other and respectively connected to the first electrode and the second electrode, wherein the phase shifters covering the second output end of the optical-splitting element odd-numbered column of the same stage are connected to each other and respectively connected to a third electrode and a fourth electrode, wherein the phase shifters covering the first output end of the optical-splitting element even-numbered of the same stage are connected to each other and respectively connected to a fifth electrode and a sixth electrode, wherein the phase shifters covering the second output end of the optical-splitting element even-numbered of the same stage are connected to each other and respectively connected to a seventh electrode and an eighth electrode.

9. The adjustable optical phase shifter array of claim 1, wherein each of the output ends of the phase shifters of the $k^{th}$ stage is connected to an optical waveguide having a fine-tuning phase shifter in order to fine tune a phase of each of output ends of the phase shifters of the $k^t$ stage.

10. The adjustable optical phase shifter array of claim 9, further comprising an intermediate stage comprising a plurality of fine-tuning phase shifters connected to form a fine-tuning phase shifter group, wherein the phase shifters of subsequent stages of the fine-tuning phase shifter group are connected to the fine-tuning phase shifter group in order to add one phase shift to output ends of the phase shifters of the $k^{th}$ stage.

11. The adjustable optical phase shifter array of claim 1, further comprising an intermediate stage, wherein the intermediate stage comprises a plurality of fine-tuning phase shifters, and the fine-tuning phase shifters are configured to fine tune phases of output ends of the phase shifters after the intermediate stage.

12. The adjustable optical phase shifter array of claim 1, further comprising an intermediate stage, wherein the phase shifters of the $1^{st}$~$k^{th}$ stages is divided into a first set before the intermediate stage and a second set after the intermediate stage, wherein the first set comprises one or more stages of the $1^{st}$~$k^{th}$ stages and the second set comprises the other of the $1^{st}$~$k^{th}$ stages, wherein the first set provides a phase shift of the stage(s) in the first set before the intermediate stage, and the second set provides a phase shift of the stage(s) in the second set after the intermediate stage, wherein the intermediate stage of the adjustable optical phase shifter array has additional fine-tuning phase shifters.

13. The adjustable optical phase shifter array of claim 1, wherein the phase shifter is an optical waveguide section having an electro-optic effect to change the phase.

14. The adjustable optical phase shifter array of claim 1, wherein the phase shifter is an optical waveguide section having an electro-optic effect to change the phase.

* * * * *